(12) United States Patent
Ou et al.

(10) Patent No.: US 10,809,767 B2
(45) Date of Patent: Oct. 20, 2020

(54) ELECTRONIC DEVICE WITH FLEXIBLE DISPLAY

(71) Applicant: Google LLC, Mountain View, CA (US)

(72) Inventors: Davis Ou, New Taipei (TW); Eugene Liao, Taipei (TW); Han-Wen Yeh, New Taipei (TW); Max Chuang, Mountain View, CA (US); Mike Liu, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/170,967

(22) Filed: Oct. 25, 2018

(65) Prior Publication Data

US 2020/0133340 A1  Apr. 30, 2020

(51) Int. Cl.
*G06F 1/16* (2006.01)

(52) U.S. Cl.
CPC .......... *G06F 1/1652* (2013.01); *G06F 1/1626* (2013.01); *G06F 1/1679* (2013.01); *G06F 1/1681* (2013.01)

(58) Field of Classification Search
CPC .... G06F 1/1652; G06F 1/1616; G06F 1/1681; G06F 2203/04102; G06F 1/1641; G06F 1/1624; G06F 1/1679; G06F 1/1618; G06F 1/1626; G06F 1/16; G06F 1/1613; G06F 1/163; G06F 1/1637
See application file for complete search history.

(56) References Cited

U.S. PATENT DOCUMENTS

| 8,873,225 | B2* | 10/2014 | Huitema | G06F 1/1615 |
| | | | | 361/679.01 |
| 9,964,995 | B1* | 5/2018 | Morrison | H01Q 1/243 |
| 9,971,382 | B2 | 5/2018 | Ahrens et al. | |
| 10,008,135 | B2* | 6/2018 | Lim | G09F 9/00 |
| 2006/0120029 | A1* | 6/2006 | Ryu | G06F 1/1624 |
| | | | | 361/679.09 |
| 2011/0063783 | A1* | 3/2011 | Shim | G06F 1/1615 |
| | | | | 361/679.01 |
| 2012/0002360 | A1* | 1/2012 | Seo | G06F 1/1616 |
| | | | | 361/679.01 |

(Continued)

FOREIGN PATENT DOCUMENTS

| EP | 2993551 A1 | 3/2016 |
| WO | 2014087951 A1 | 6/2014 |

OTHER PUBLICATIONS

International Search Report and Written Opinion for PCT Application No. PCT/US2019/057213, dated Feb. 4, 2020, 12 pages.

*Primary Examiner* — Anthony Q Edwards
(74) *Attorney, Agent, or Firm* — Brake Hughes Bellermann LLP

(57) ABSTRACT

An electronic device includes: a processor; a memory; a first body portion; a second body portion coupled to the first body portion by a hinge, the second body portion including a plate; a slider having a slot therein, wherein the plate slidingly engages with the slot to facilitate the slider assuming at least first and second positions relative to the second body portion; and a flexible display attached to the first body portion and the slider, wherein the flexible display has a substantially planar configuration in the first position of the slider and a substantially folded configuration in the second position of the slider.

22 Claims, 4 Drawing Sheets

(56) References Cited

U.S. PATENT DOCUMENTS

| | | | | |
|---|---|---|---|---|
| 2012/0243206 A1* | 9/2012 | Wang | ........................ | G09F 9/30 |
| | | | | 362/97.1 |
| 2017/0169741 A1* | 6/2017 | Lim | .......................... | G09F 9/00 |
| 2017/0243526 A1* | 8/2017 | Lim | .......................... | G09F 9/00 |
| 2018/0103550 A1* | 4/2018 | Seo | ......................... | H04N 5/64 |
| 2018/0146560 A1* | 5/2018 | Chen | ................... | H05K 5/0017 |
| 2018/0198896 A1* | 7/2018 | Kang | .................... | G06F 1/1681 |
| 2019/0243424 A1* | 8/2019 | Lee | ....................... | G06F 1/1681 |

\* cited by examiner

ELECTRONIC DEVICE WITH FLEXIBLE DISPLAY

TECHNICAL FIELD

This document relates, generally, to an electronic device with a flexible display.

BACKGROUND

Electronic devices such as smartphones and tablets are sometimes designed so that an enclosure is formed by a housing and a display of the electronic device joined to each other. Introduction of new types of displays including flexible displays can place additional demands on the enclosure in this or other regards.

SUMMARY

In a first aspect, an electronic device includes: a processor; a memory; a first body portion; a second body portion coupled to the first body portion by a hinge, the second body portion including a plate; a slider having a slot therein, wherein the plate slidingly engages with the slot to facilitate the slider assuming at least first and second positions relative to the second body portion; and a flexible display attached to the first body portion and the slider, wherein the flexible display has a substantially planar configuration in the first position of the slider and a substantially folded configuration in the second position of the slider.

Implementations can include any or all of the following features. The plate extends in a direction away from the hinge perpendicular to a rotation axis of the hinge. The flexible display includes an organic light-emitting diode display. In the substantially folded configuration the flexible display is bent approximately 180 degrees. The slider is configured to be closer to the second body portion in the second position of the slider than in the first position of the slider. The slider is configured to abut the second body portion in the second position of the slider. The electronic device further comprises an edge on the slider, the edge parallel to a rotation axis of the hinge, wherein an edge of the flexible display abuts the edge of the slider in the first and second positions of the slider. The first body portion has a first outer surface that extends along the flexible display, and a second outer surface that is parallel to the first outer surface and opposite the first body portion from the first outer surface, and wherein the hinge is offset partially beyond the second outer surface in a direction away from the first surface so that the second outer surface forms a recess adjacent the hinge. The recess is configured to at least partially contain the slider in the second position of the slider. The hinge comprises a pin that is included in the second body portion and a knuckle that is included in the first body portion. The first body portion has a frame adjacent at least a portion of an edge of the flexible display, the frame configured to protect the portion of the edge. The second body portion has a frame adjacent at least a portion of an edge of the flexible display, the frame configured to protect the portion of the edge. The slider has a frame adjacent at least a portion of an edge of the flexible display, the frame configured to protect the portion of the edge. The second body portion is substantially aligned with the first body portion in the substantially planar configuration of the flexible display. The second body portion is substantially parallel to the first body portion, and overlapping the first body portion in the substantially folded configuration of the flexible display.

In a second aspect, an electronic device includes: a processor; a memory; a flexible display having at least a first configuration where the flexible display is substantially planar, and a second configuration where the flexible display is non-planar; and a hinged enclosure that supports the flexible display in the first and second configurations, the hinged enclosure including a first body portion and a second body portion that are coupled to each other by a hinge, and a slider attached to the flexible display that is configured to slide relative to at least the second body portion as the flexible display assumes the first or second configuration.

Implementations can include any or all of the following features. At least one of the first body portion, the second body portion, or the slider, has a frame adjacent at least a portion of an edge of the flexible display, the frame configured to protect the portion of the edge. The hinge comprises a knuckle on the first body portion and a pin on the second body portion, wherein the first body portion has a first outer surface that extends along the flexible display, and a second outer surface that is parallel to the first outer surface and opposite the first body portion from the first outer surface, and wherein the knuckle is offset partially beyond the second outer surface in a direction away from the first outer surface so that the second outer surface forms a recess adjacent the knuckle. The recess is configured to at least partially contain the slider in the second position of the slider.

In a third aspect, an electronic device includes: a processor; a memory; a flexible display having at least a substantially planar configuration and a substantially folded configuration wherein the flexible display is bent approximately 180 degrees; and a hinged enclosure that supports the flexible display in the substantially planar and substantially folded configurations, the hinged enclosure including (i) a first body portion attached to the flexible display, (ii) a second body portion coupled to the first body portion by a hinge, the second body portion including a plate, and (iii) a slider attached to the flexible display, the slider having a slot therein, wherein the plate slidingly engages with the slot to facilitate the slider assuming at least first and second positions relative to the second body portion.

Implementations can include any or all of the following features. The electronic device further comprises an actuator mounted to the first body portion, the actuator configured to bring the slider to the first position as the flexible display assumes the substantially planar configuration, and to bring the slider to the second position as the flexible display assumes the substantially folded configuration. The electronic device further comprises a linkage that couples the actuator to the slider.

BRIEF DESCRIPTION OF DRAWINGS

Like reference symbols in the various drawings indicate like elements.

DETAILED DESCRIPTION

This document describes examples of an electronic device having a flexible display. In some implementations, the electronic device has an enclosure to facilitate that the flexible display assumes at least a substantially planar configuration or a substantially folded configuration. The electronic device can be operable to present content on all or some of the flexible display in the substantially planar and folded configurations. The electronic device can be operable to receive input (e.g., by way of a touchscreen functionality integrated with the flexible display) in the substantially planar and folded configurations. The electronic device can have a slider that is engaged to slide relative to another portion of the enclosure and assume a position corresponding to the configuration of the flexible display.

Figure 1:
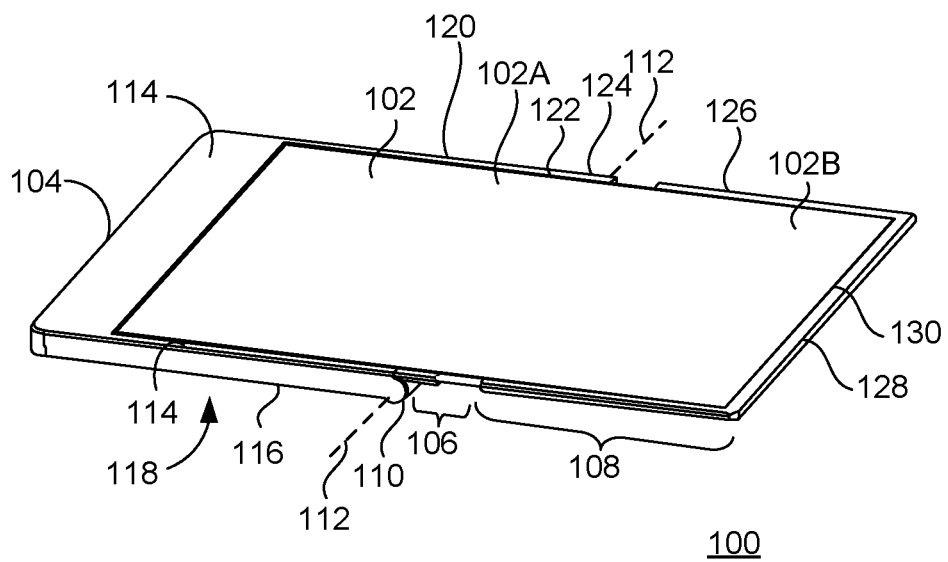
FIG. 1 shows an example of an electronic device in an open configuration.

FIG. 1 shows an example of an electronic device 100 in an open configuration. The electronic device 100 can be used with one or more other examples described herein. The electronic device 100 includes a flexible display 102. In some implementations, the electronic device 100 having the flexible display 102 can serve as a portable or otherwise mobile electronic device. For example, the electronic device 100 can be used in circumstances where a user might otherwise operate a smartphone, tablet and/or a laptop device. For these and other purposes, the electronic device 100 can include a processing component, storage media and interfaces (e.g., a wireless) interface) which are not described in detail here for brevity. The electronic device 100 can be implemented using some or all of the examples described below with reference to FIG. 8.

The flexible display 102 provides an adjustable display solution for the electronic device 100. The flexible display 102 can allow the electronic device 100 to be operated in one or more configurations, including, but not limited to, a substantially open configuration (e.g., as shown) or one or more substantially closed configurations. Any of multiple types of flexible display technology can be used to implement the flexible display 102. In some implementations, the flexible display is implemented in a flexible substrate and is electrically powered so as to be able to emit light in a controlled fashion to present content. For example, the flexible display 102 can include an organic light-emitting diode (OLED) display component. As such, the flexible display 102 can include an OLED display. In some implementations, the flexible display 102 may not be backlit and can operate by selectively reflecting ambient light to present content. For example, the flexible display 102 can include electronic paper such as e-paper.

The flexible display 102 as shown has a substantially planar configuration. In some implementations, the substantially planar configuration involves a portion 102A of the flexible display 102 (e.g., the left side thereof in the present example) being substantially coplanar with a portion 102B of the flexible display 102 (e.g., the right side thereof in the present example). For example, the portions 102A-B can occupy substantially a common plane in the substantially planar configuration of the flexible display 102.

The electronic device 100 can include a body portion 104. The body portion 104 can form part of the enclosure or housing of the electronic device 100 and can be made from any suitable material. For example, the body portion 104 can include metal (e.g., an alloy such as one predominantly based on aluminum) and/or a polymer material (e.g., a plastic material). The body portion 104 can include some or all of the circuitry of the electronic device 100.

The electronic device 100 includes a body portion 106. The body portion 106 can form part of the enclosure or housing of the electronic device 100 and can be made from any suitable material. For example, the body portion 106 can include metal (e.g., an alloy such as one predominantly based on aluminum) and/or a polymer material (e.g., a plastic material). In the present configuration, the body portion 106 is substantially aligned with the body portion 104.

The electronic device 100 includes a slider 108. The slider 108 can form part of the enclosure or housing of the electronic device 100 and can be made from any suitable material. For example, the slider 108 can include metal (e.g., an alloy such as one predominantly based on aluminum) and/or a polymer material (e.g., a plastic material). In the present configuration, the slider 108 is substantially aligned with the body portion 104. Here, the slider 108 is separated from the body portion 106 by a distance.

The electronic device 100 includes a hinge 110 that can extend across some or all of the electronic device 100. In some implementations, the hinge 110 can facilitate transition between two or more configurations of the electronic device 100. The hinge 110 can provide rotation in one or more directions according to a rotation axis 112 which is here schematically illustrated using a dashed line.

In some implementations, the body portions 104 and 106, the slider 108, and the hinge 110 can be considered a hinged enclosure of the electronic device 100. For example, the hinged enclosure can support the flexible display 102.

The electronic device 100 has an outer surface 114 on the body portion 104. The outer surface 114 extends along the flexible display 102 in the present configuration. In some implementations, the outer surface 114 has substantially the same orientation as the portion 102A of the flexible display 102. The electronic device 100 has an outer surface 116 on the body portion 104. The outer surface 116 is currently not visible due to the orientation of the electronic device 100. The outer surface 116 can be parallel to the outer surface 114. The outer surface 116 can be opposite the body portion 104 from the outer surface 114. The hinge 110 can be offset partially beyond the outer surface 116 in a direction away from the outer surface 114. For example, the hinge 110 is partially offset beyond the outer surface in that some, but less than all, of the hinge 110 is positioned further from the outer surface 114 than is the outer surface 116. The outer surface 116 can form a recess 118 adjacent the hinge 110. The recess 118 can extend along a plane of the outer surface 116 and be delimited by structure on at least one edge; here, the hinge 110 defines the depth and one end of the recess 118.

The electronic device 100 can have a frame 120 on the body portion 104. In some implementations, the frame 120 is positioned adjacent at least a portion of an edge 122 of the flexible display 102. The edge 122 can extend along an entire side of the flexible display 102. For example, the frame 120 can be configured to protect the portion of the edge 122. The frame 120 can be positioned on one or more sides of the body portion 104, including, but not limited to, on two opposing sides of the body portion 104.

The electronic device 100 can have a frame 124 on the body portion 106. In some implementations, the frame 124 is positioned adjacent at least a portion of the edge 122 of the flexible display 102. For example, the frame 124 can be configured to protect the portion of the edge 122. The frame 124 can be positioned on one or more sides of the body portion 106, including, but not limited to, on two opposing sides of the body portion 104.

The electronic device 100 can have a frame 126 on the slider 108. In some implementations, the frame 126 is positioned adjacent at least a portion of the edge 122 of the flexible display 102. For example, the frame 126 can be configured to protect the portion of the edge 122. The frame 126 can be positioned on one or more sides of the slider 108, including, but not limited to, on two opposing sides of the slider 108.

The electronic device 100 can have an edge 128 on the slider 108. The edge 128 is here parallel to the rotation axis 112 of the hinge 110. The edge 128 can be substantially perpendicular to the frame 126. The edge 128 can abut an edge 130 of the flexible display 102. The edge 130 of the flexible display 102 can be substantially perpendicular to the edge 122.

Figure 2:
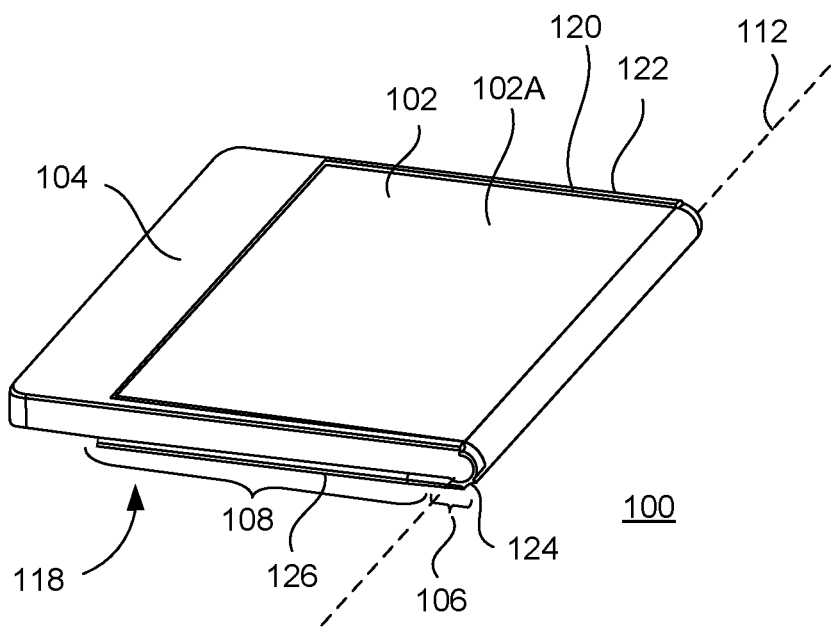
FIG. 2 shows an example of the electronic device of FIG. 1 in a closed configuration.

FIG. 2 shows an example of the electronic device 100 of FIG. 1 in a closed configuration. The electronic device 100 as illustrated can be used with one or more other examples described herein. In some implementations, at least the body portion 106 has been rotated about the rotation axis 112. Here, the slider 108 has also rotated about the rotation axis 112. The electronic device 100 is currently in a non-planar configuration. The electronic device 100 can presently be considered to be in a closed configuration. The body portion 106 is currently substantially parallel to the body portion 104. The body portion 106 currently overlaps the body portion 104.

In some implementations, the flexible display 102 can presently be considered to be in a substantially folded configuration. The portion 102A of the flexible display 102 is presently visible and the portion 102B (FIG. 1) is not presently visible due to the orientation of the electronic device 100. In some implementations, in a substantially folded configuration the flexible display 102 can be bent approximately 180 degrees. For example, the portion 102A of the flexible display 102 and the portion 102B (FIG. 1) of the flexible display 102 can may have been bent approximately 180 degrees relative to each other as the flexible display 102 assumes the substantially folded configuration.

The slider 108 can undergo translation (e.g., slide) as the electronic device 100 assumes another configuration. This can be done manually (e.g., by way of a force applied by the user's hand(s)), or automatically by the electronic device 100 (e.g., by way of one or more implemented mechanisms). As a result of sliding, in the substantially folded configuration of the flexible display 102 the slider 108 can be closer to the body portion 106 than in the substantially planar configuration of the flexible display 102 (e.g., as shown in FIG. 1). For example, the slider 108 can abut the body portion 106 in the substantially folded configuration of the flexible display 102.

It was mentioned in the example above that the edge 128 (FIG. 1) of the slider 108 can abut the edge 130 of the flexible display 102 in the substantially planar configuration of the flexible display 102. In a substantially folded configuration of the flexible display 102 (e.g., as shown in FIG. 2), the edge 128 (FIG. 1) of the slider 108 can likewise abut the edge 130 of the flexible display 102 although this is not presently visible due to the orientation of the electronic device 100.

The recess 118 can be configured to at least partially contain the slider 108 in a substantially folded configuration of the flexible display 102 (e.g., as shown in FIG. 2). In some implementations, this can provide a slimmer design for the electronic device 100 with less protruding structure.

One or more frames can protect the flexible display 102 in a substantially folded configuration thereof. Here, at least one of the frame 120 on the body portion 104, the frame 124 on the body portion 106, and/or the frame 126 on the slider 108 can protect the flexible display 102. For example, the edge 122 of the flexible display 102 and/or another edge of the flexible display 102 can be protected.

The electronic device 100 is an example of an electronic device that includes a flexible display (e.g., the flexible display 102) having at least a first configuration (e.g., as shown in FIG. 1) where the flexible display is substantially planar, and a second configuration (e.g., as shown in FIG. 2) where the flexible display is non-planar. The electronic device includes a hinged enclosure that supports the flexible display in the first and second configurations. The hinged enclosure including a first body portion (e.g., the body portion 104) and a second body portion (e.g., the body portion 106) that are coupled to each other by a hinge (e.g., the hinge 110). The hinged enclosure includes a slider (e.g., the slider 108) attached to the flexible display. The slider is configured to slide relative to at least the second body portion as the flexible display assumes the first or second configuration.

Figure 3:
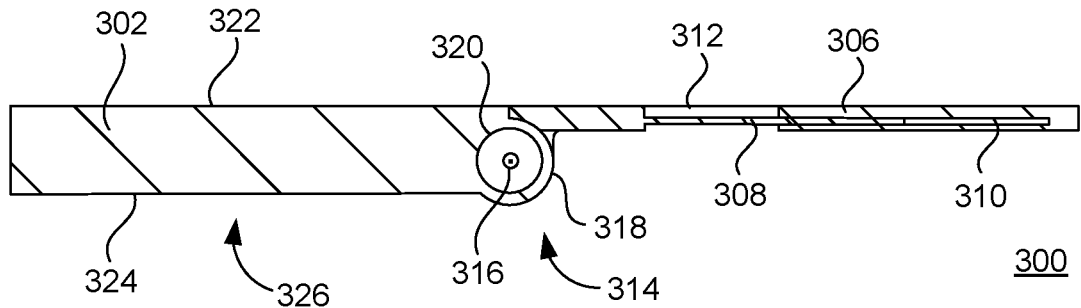
FIG. 3 shows an example of a cross-section of an electronic device.

FIG. 3 shows an example of a cross-section of an electronic device 300. The electronic device 300 can be used with one or more other examples described herein. Aspects of the electronic device 300 corresponding to those described in other examples can serve similarly or identically in the electronic device 300.

The electronic device 300 includes a body portion 302, a body portion 304 and a slider 306. The body portion 304 includes a plate 308. The slider 306 includes a slot 310. The plate 308 can be a substantially planar member that extends from the rest of the body portion 304. The plate 308 can slidingly engage with the slot 310 to facilitate the slider 306 assuming one or more positions. For example, the slider 306 can assume the position shown in the present illustration, which can correspond to a open configuration of the electronic device 300. In an open configuration, the electronic device 300 can be substantially planar. A flexible display can be protected by one or more aspects of the electronic device 300 in an open configuration. For example, the body portion 302, the body portion 304, and/or the slider 306 can protect the flexible display. The flexible display is not visible in the present cross section of the electronic device 300.

A plate 312 is here part of the electronic device 300. In some implementations, the plate 312 can be coupled to the slider 306. For example, the plate 312 can travel with the slider 306 when the slider 306 assumes positions relative to the body portion 304. In some implementations, the plate 312 can be coupled to the body portion 304. For example, the plate 312 can remain stationary relative to the body portion 304 when the slider 306 assumes positions relative to the body portion 304.

The electronic device 300 can include one or more hinges. Here, the electronic device 300 includes a hinge 314. In some implementations, the hinge 314 can facilitate transition between two or more configurations of the electronic device 300. The hinge 314 can provide rotation in one or more directions according to a rotation axis 316 which extends into and out of the plane of the illustration and is here schematically illustrated using a circled dot. The body portion 304 is here configured so that the plate 308 extends in a direction away from the hinge 314 in the plane of the illustration. That is, the plate 308 is here perpendicular to the rotation axis 316. The hinge 314 can extend across substantially an entire width of the electronic device 300.

The hinge 314 can include a knuckle 318 and a pin 320. In some implementations, the knuckle 318 forms a housing with a smooth cylindrical inside that is configured to allow rotation of the pin 320 relative to the knuckle 318. In some implementations, the knuckle 318 is coupled to the body portion 302. For example, the knuckle 318 can be part of the body portion 302. In some implementations, the pin 320 can be coupled to the body portion 304. For example, the pin 320 can be part of the body portion 304.

Any of multiple types of hinges can be used for the electronic device 300. In some implementations, the hinge 314 is a free-stop hinge. For example, the free-stop hinge can allow the electronic device 300 to enter and remain in a configuration characterized in an arbitrary angle between the body portions 302 and 304. The hinge 314 can require a torque force (e.g., a certain modicum of applied) torque to transition from one configuration to another configuration.

The electronic device 300 has an outer surface 322 on the body portion 302. The outer surface 322 extends along the flexible display (not shown) in the present configuration. The electronic device 300 has an outer surface 324 on the body portion 302. The outer surface 324 can be parallel to the outer surface 322. The outer surface 324 can be opposite the body portion 302 from the outer surface 322. The hinge 314 can be offset partially beyond the outer surface 324 in a direction away from the outer surface 322. For example, the hinge 314 is partially offset beyond the outer surface in that some, but less than all, of the hinge 314 is positioned further from the outer surface 322 than is the outer surface 324. The outer surface 324 can form a recess 326 adjacent the hinge 314.

The electronic device 300 is an example of an electronic device where a hinge (e.g., the hinge 314) comprises a knuckle (e.g., the knuckle 318) on a first body portion (e.g., on the body portion 302) and a pin (e.g., the pin 320) on a second body portion. The first body portion can have a first outer surface (e.g., the outer surface 322) that extends along a flexible display, and a second outer surface (e.g., the outer surface 324) that is parallel to the first outer surface and opposite the first body portion from the first outer surface. The knuckle can be offset partially beyond the second outer surface in a direction away from the first outer surface so that the second outer surface forms a recess (e.g., the recess 326) adjacent the knuckle.

Figure 4:
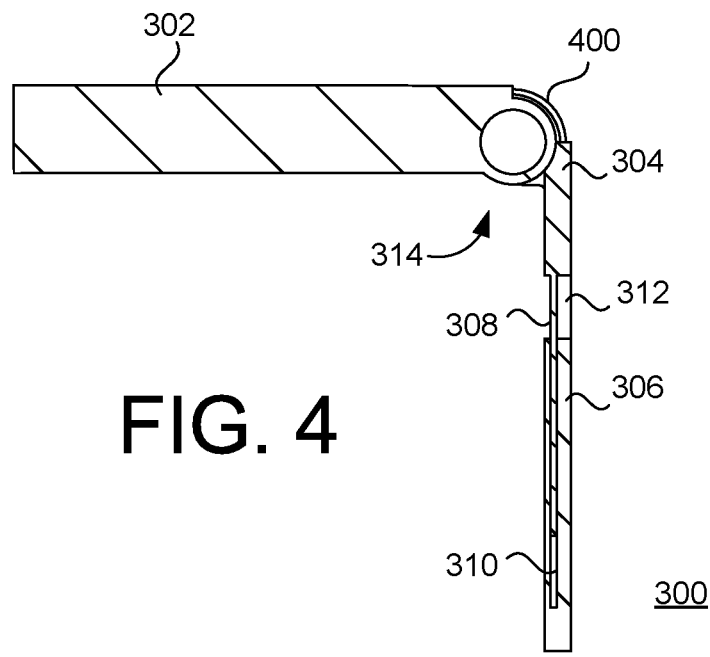
FIG. 4 shows another example of a cross-section of the electronic device in FIG. 3.

FIG. 4 shows another example of a cross-section of the electronic device 300 in FIG. 3. The electronic device 300 as illustrated can be used with one or more other examples described herein. Here, the body portion 304 and the slider 306 have been rotated relative to the body portion 302 (or vice versa) about the hinge 314 so that the electronic device 300 assumes a non-planar configuration. A flexible display 400 is here visible and is shown curved about the hinge 314, while the rest of the flexible display 400 is obscured by the body portion 302, the body portion 304, and the slider 306. This can be considered a non-planar configuration of the flexible display 400. The configuration in FIG. 3, moreover, can be considered a substantially planar configuration of the flexible display 400. The flexible display 400 can be attached to the body portion 302 and to the slider 306, to name just two examples.

The slider 306 has here assumed a different position than that shown in FIG. 3. In some implementations, the slider 306 has moved closer to the body portion 304 than when the flexible display 400 was in the substantially planar configuration. For example, the relocation of the slider 306 can be facilitated by the plate 308 slidingly engaging with the slot 310. Also, somewhat less of the plate 312 is currently visible between the body portion 304 and the slider 306.

Figure 5:
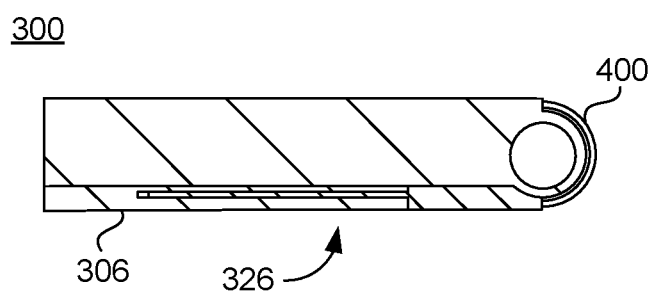
FIG. 5 shows another example of a cross-section of the electronic device in FIG. 3.

FIG. 5 shows another example of a cross-section of the electronic device 300 in FIG. 3. The electronic device 300 as illustrated can be used with one or more other examples described herein. The electronic device 300 can presently be considered to be in a closed configuration. In some implementations, this can correspond to the flexible display 400 being in a substantially folded configuration. For example, the flexible display 400 can be bent approximately 180 degrees.

The recess 326 can be configured to at least partially contain the slider 306 in a substantially folded configuration of the flexible display 400. In some implementations, this can provide a slimmer design for the electronic device 300 with less protruding structure.

As a result of sliding, in the substantially folded configuration of the flexible display 400 the slider 306 can be closer to the body portion 304 than in the substantially planar configuration of the flexible display 400 (e.g., as shown in FIG. 3). For example, the slider 306 can abut the body portion 304 in the substantially folded configuration of the flexible display 400.

The plate 308 and the slot 310, and/or the sliding engagement between them, can provide advantages. The plate 308 and the slot 310 can provide that the slider 306 is aligned with the body portion 304 and/or with the body portion 302 in the open state (e.g., FIG. 3). In some implementations, protection for the flexible display 400 can be provided. The plate 308 and the slot 310 can be dimensioned so that there is a substantial amount of overlap between them also in the open position, which can increase the structural integrity of the electronic device in the open state. In some implementations, the plate 308 and the slot 310 can provide that substantially the same tension is provided in the flexible display 400 in an open state (e.g., FIG. 3), in a closed state (e.g., FIG. 5), and/or in a state between an open and a closed state (e.g., FIG. 4). The plate 308 can be in contact with the opposing surfaces that form the slot 310 on opposite sides of the plate 308. This can allow good control of the amount of friction when moving the slider 306 in either direction. For example, the amount of friction can be controlled to allow for easy adjustment of the electronic device 100 while protecting against unwanted sliding or movement. The plate 308 and the slot 310 can avoid or reduce the extent to which the flexible display 400 slides between opposing components in transitioning between open and closed states. For example, this can reduce wear on the flexible display 400 that may otherwise occur.

The electronic device 300 is an example of an electronic device that includes a first body portion (e.g., the body portion 302), a second body portion (e.g., the body portion 304) coupled to the first body portion by a hinge (e.g., the hinge 314), the second body portion including a plate (e.g., the plate 308). The electronic device includes a slider (e.g., the slider 306) having a slot (e.g., the slot 310) therein. The plate slidingly engages with the slot to facilitate the slider assuming at least first (e.g., as shown in FIG. 3) and second (e.g., as shown in FIGS. 4 and/or 5) positions relative to the second body portion. The electronic device includes a flexible display (e.g., the flexible display 400) attached to the first body portion and the slider. The flexible display has a substantially planar configuration in the first position of the slider and a substantially folded configuration in the second position of the slider.

The electronic device 300 is an example of an electronic device including a flexible display (e.g., the flexible display 400) having at least a substantially planar configuration (e.g., as shown in FIG. 3) and a substantially folded configuration (e.g., as shown in FIG. 5) wherein the flexible display is bent approximately 180 degrees. The electronic device includes a hinged enclosure that supports the flexible display in the substantially planar and substantially folded configurations. The hinged enclosure includes (i) a first body portion (e.g., the body portion 302) attached to the flexible display, (ii) a second body portion (e.g., the body portion 304) coupled to the first body portion by a hinge (e.g., the hinge 314), the second body portion including a plate (e.g., the plate 308), and (iii) a slider (e.g., the slider 306) attached to the flexible display, the slider having a slot (e.g., the slot 310) therein, wherein the plate slidingly engages with the slot to facilitate the slider assuming at least first and second positions relative to the second body portion.

Figure 6:
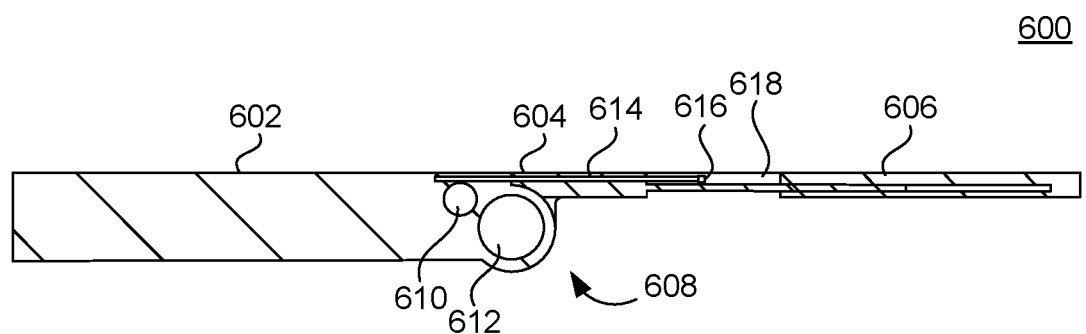
FIG. 6 shows an example of a cross-section of an electronic device having an actuator.

FIG. 6 shows an example of a cross-section of an electronic device 600 having an actuator. The electronic device 600 can be used with one or more other examples described herein. Aspects of the electronic device 600 corresponding to those described in other examples can serve similarly or identically in the electronic device 600.

The electronic device 600 includes a body portion 602, a body portion 604, and a slider 606. The electronic device 600 can have a hinged enclosure where relative rotation between the body portion 602, the body portion 604 and the slider 606, is facilitated by a hinge 608. The electronic device 600 is currently shown in an open position. In some implementations, this can correspond to a substantially planar configuration of a flexible display.

The electronic device 600 includes an actuator 610. The actuator 610 can include a mechanical and/or an electrical actuating mechanism that is configured to causing the slider 606 to assume another position. In some implementations, the actuator 610 can be engaged by a pin 612 that is part of the hinge 608. For example, relative rotation between the pin 612 and the body portion 602 can cause the actuator 610 to move the slider 606 relative to the body portion 604.

The electronic device 600 can include at least one linkage 614 that is coupled to the actuator 610 and to the slider 606. The linkage 614 can be configured to convey the actuation of the actuator 610 to the slider 606. In some implementations, the linkage 614 can include a flexible mechanical element configured to advance the slider 606 away from the body portion 604. For example, the actuation intermediated by the linkage 614 can involve the linkage 614 pushing the slider 606 away from the body portion 604 when entering a substantially planar configuration of the flexible display. As another example, the actuation intermediated by the linkage 614 can involve the linkage 614 pulling the slider 606 closer to the body portion 604 when entering a substantially folded configuration of the flexible display. The linkage 614 can be coupled to a linkage point 616 that is on a plate 618 coupled to the slider 606.

Figure 7:
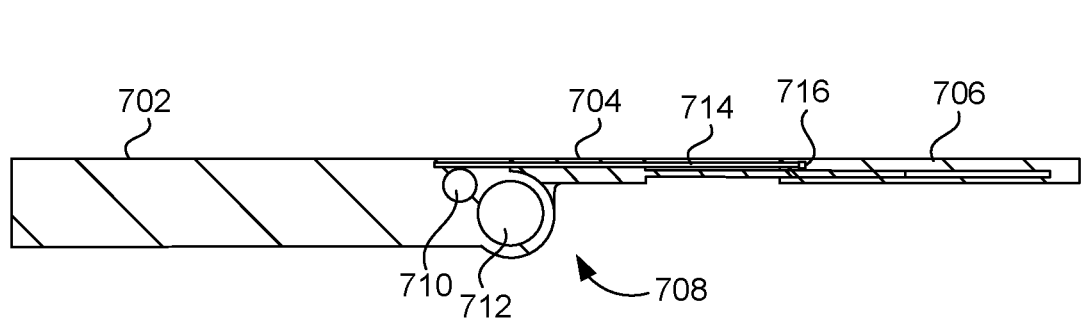
FIG. 7 shows another example of a cross-section of an electronic device having an actuator.

FIG. 7 shows an example of a cross-section of an electronic device 700 having an actuator. The electronic device 700 can be used with one or more other examples described herein. Aspects of the electronic device 700 corresponding to those described in other examples can serve similarly or identically in the electronic device 700.

The electronic device 700 includes a body portion 702, a body portion 704, and a slider 706. The electronic device 700 can have a hinged enclosure where relative rotation between the body portion 702, the body portion 704 and the slider 706, is facilitated by a hinge 708. The electronic device 700 is currently shown in an open position. In some implementations, this can correspond to a substantially planar configuration of a flexible display.

The electronic device 700 includes an actuator 710. The actuator 710 can include a mechanical and/or an electrical actuating mechanism that is configured to causing the slider 706 to assume another position. In some implementations, the actuator 710 can be engaged by a pin 712 that is part of the hinge 708. For example, relative rotation between the pin 712 and the body portion 702 can cause the actuator 710 to move the slider 706 relative to the body portion 604.

The electronic device 700 can include at least one linkage 714 that is coupled to the actuator 710 and to the slider 706. The linkage 714 can be configured to convey the actuation of the actuator 710 to the slider 706. In some implementations, the linkage 714 can include a flexible mechanical element configured to advance the slider 706 away from the body portion 704. For example, the actuation intermediated by the linkage 714 can involve the linkage 714 pushing the slider 706 away from the body portion 704 when entering a substantially planar configuration of the flexible display. As another example, the actuation intermediated by the linkage 714 can involve the linkage 714 pulling the slider 706 closer to the body portion 704 when entering a substantially folded configuration of the flexible display. The linkage 714 can be coupled to a linkage point 716 that is on the slider 706.

Figure 8:
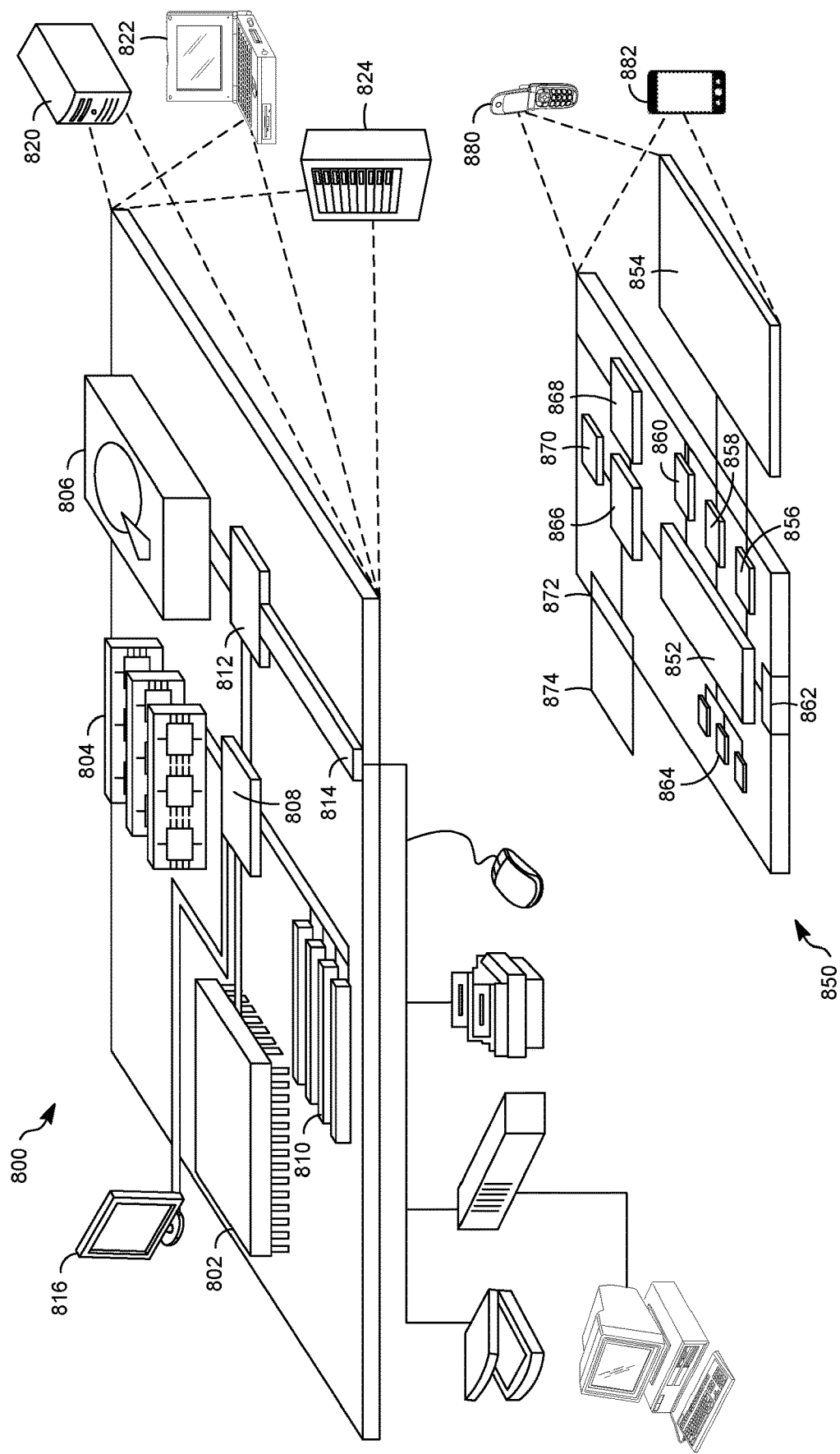
FIG. 8 shows an example of a computer device and a mobile computer device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, tablets, workstations, personal digital assistants, televisions, servers, blade servers, mainframes, and other appropriate computing devices. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. The processor 802 can be a semiconductor-based processor. The memory 804 can be a semiconductor-based memory. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. An electronic device comprising:
   a processor;
   a memory;
   a first body portion;
   a second body portion coupled to the first body portion by a hinge, the second body portion including a plate;
   a slider having a slot therein, wherein the plate slidingly engages with the slot to facilitate the slider assuming at least first and second positions relative to the second body portion, wherein the slider is configured to be closer to the second body portion in the second position of the slider than in the first position of the slider; and
   a flexible display attached to the first body portion and the slider, wherein the flexible display has a substantially planar configuration in the first position of the slider and a substantially folded configuration in the second position of the slider.

2. The electronic device of claim 1, wherein the plate extends in a direction away from the hinge perpendicular to a rotation axis of the hinge.

3. The electronic device of claim 1, wherein the flexible display includes an organic light-emitting diode display.

4. The electronic device of claim 1, wherein in the substantially folded configuration the flexible display is bent approximately 180 degrees.

5. The electronic device of claim 1, wherein the slider is configured to abut the second body portion in the second position of the slider.

6. The electronic device of claim 1, further comprising an edge on the slider, the edge parallel to a rotation axis of the hinge, wherein an edge of the flexible display abuts the edge of the slider in the first and second positions of the slider.

7. The electronic device of claim 1, wherein the first body portion has a first outer surface that extends along the flexible display, and a second outer surface that is parallel to the first outer surface and opposite the first body portion from the first outer surface, and wherein the hinge is offset partially beyond the second outer surface in a direction away from the first outer surface so that the second outer surface forms a recess adjacent the hinge.

8. The electronic device of claim 7, wherein the recess is configured to at least partially contain the slider in the second position of the slider.

9. The electronic device of claim 7, wherein the hinge comprises a pin that is included in the second body portion and a knuckle that is included in the first body portion.

10. The electronic device of claim 1, wherein the first body portion has a frame adjacent at least a portion of an edge of the flexible display, the frame configured to protect the portion of the edge.

11. The electronic device of claim 1, wherein the second body portion has a frame adjacent at least a portion of an edge of the flexible display, the frame configured to protect the portion of the edge.

12. The electronic device of claim 1, wherein the slider has a frame adjacent at least a portion of an edge of the flexible display, the frame configured to protect the portion of the edge.

13. The electronic device of claim 1, wherein the second body portion is substantially aligned with the first body portion in the substantially planar configuration of the flexible display.

14. The electronic device of claim 13, wherein the second body portion is substantially parallel to the first body portion, and overlapping the first body portion in the substantially folded configuration of the flexible display.

15. The electronic device of claim 1, wherein the flexible display faces outward in the substantially folded configuration.

16. An electronic device comprising:
 a processor;
 a memory;
 a flexible display having at least a first configuration where the flexible display is substantially planar, and a second configuration where the flexible display is non-planar; and
 a hinged enclosure that supports the flexible display in the first and second configurations, the hinged enclosure including a first body portion and a second body portion that are coupled to each other by a hinge, and a slider attached to the flexible display, the slider configured to slide relative to at least the second body portion as the flexible display assumes the first or second configuration, wherein the hinge comprises a knuckle on the first body portion and a pin on the second body portion, wherein the first body portion has a first outer surface that extends along the flexible display, and a second outer surface that is parallel to the first outer surface and opposite the first body portion from the first outer surface, and wherein the knuckle is offset partially beyond the second outer surface in a direction away from the first outer surface so that the second outer surface forms a recess adjacent the knuckle.

17. The electronic device of claim 16, wherein at least one of the first body portion, the second body portion, or the slider, has a frame adjacent at least a portion of an edge of the flexible display, the frame configured to protect the portion of the edge.

18. The electronic device of claim 16, wherein the recess is configured to at least partially contain the slider in the second configuration of the flexible display.

19. An electronic device comprising:
 a processor;
 a memory;
 a flexible display having at least a substantially planar configuration and a substantially folded configuration wherein the flexible display is bent approximately 180 degrees; and
 a hinged enclosure that supports the flexible display in the substantially planar and substantially folded configurations, the hinged enclosure including (i) a first body portion attached to the flexible display, (ii) a second body portion coupled to the first body portion by a hinge, the second body portion including a plate, and (iii) a slider attached to the flexible display, the slider having a slot therein, wherein the plate slidingly engages with the slot to facilitate the slider assuming at least first and second positions relative to the second body portion, wherein the first body portion has a first outer surface that extends along the flexible display, and a second outer surface that is parallel to the first outer surface and opposite the first body portion from the first outer surface, and wherein the hinge is offset partially beyond the second outer surface in a direction away from the first outer surface so that the second outer surface forms a recess adjacent the hinge.

20. The electronic device of claim 19, further comprising an actuator mounted to the first body portion, the actuator configured to bring the slider to the first position as the flexible display assumes the substantially planar configuration, and to bring the slider to the second position as the flexible display assumes the substantially folded configuration.

21. The electronic device of claim 20, further comprising a linkage that couples the actuator to the slider.

22. The electronic device of claim 19, wherein the flexible display faces outward in the substantially folded configuration.

* * * * *